United States Patent
Lai et al.

(10) Patent No.: US 9,886,064 B2
(45) Date of Patent: Feb. 6, 2018

(54) CONNECTING ASSEMBLY AND ELECTRONIC DEVICE HAVING THE SAME

(71) Applicants: Tzu-Chien Lai, Taipei (TW); Kun-Hsin Liu, Taipei (TW); Wei-Hao Lan, Taipei (TW); Ching-Tai Chang, Taipei (TW); Hong-Tien Wang, Taipei (TW); Yao-Tsung Yeh, Taipei (TW); Cheng-Hsun Lee, Taipei (TW); Chia-Ying Chen, Taipei (TW)

(72) Inventors: Tzu-Chien Lai, Taipei (TW); Kun-Hsin Liu, Taipei (TW); Wei-Hao Lan, Taipei (TW); Ching-Tai Chang, Taipei (TW); Hong-Tien Wang, Taipei (TW); Yao-Tsung Yeh, Taipei (TW); Cheng-Hsun Lee, Taipei (TW); Chia-Ying Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 770 days.

(21) Appl. No.: 14/181,742

(22) Filed: Feb. 17, 2014

(65) Prior Publication Data
US 2014/0313660 A1    Oct. 23, 2014

Related U.S. Application Data

(60) Provisional application No. 61/813,647, filed on Apr. 19, 2013.

(51) Int. Cl.
*G06F 1/16*    (2006.01)

(52) U.S. Cl.
CPC .......... *G06F 1/1654* (2013.01); *G06F 1/1669* (2013.01); *G06F 1/1681* (2013.01)

(58) Field of Classification Search
CPC .............................. G06F 1/1654; G06F 1/1669
See application file for complete search history.

(56) References Cited

U.S. PATENT DOCUMENTS

| | | | | |
|---|---|---|---|---|
| 5,740,012 A | * | 4/1998 | Choi ..................... | G06F 1/1616 361/679.39 |
| 7,692,919 B2 | * | 4/2010 | Liang .................... | G06F 1/1616 361/679.29 |

(Continued)

FOREIGN PATENT DOCUMENTS

| | | |
|---|---|---|
| TW | 573903 | 1/2004 |
| TW | M387471 | 8/2010 |

OTHER PUBLICATIONS

"Office Action of Taiwan Counterpart Application", dated Sep. 2, 2015, p. 1-p. 4, in which the listed reference was cited.

*Primary Examiner* — Robert Canfield
(74) *Attorney, Agent, or Firm* — JCIPRNET

(57) ABSTRACT

A connecting assembly is disposed between two opposite assembling sides of a first body and a second body of an electronic device. The connecting assembly includes an engaging member, an engaging portion and an elastic fixing mechanism. The engaging member is pivoted to the first body and the engaging portion is fixed to the second body. The elastic fixing mechanism is connected to the first body. When the first body is assembled to the second body, the engaging member rotates relative to the engaging portion from a first position to a second position, such that the engaging member is infixed to the engaging portion and the second body. Then elastic force of the elastic fixing mechanism fixes the engaging member together with the engaging portion and the second body, such that the first body is assembled to the second body. An electronic device having the connecting assembly is also provided.

15 Claims, 15 Drawing Sheets

(56) References Cited

U.S. PATENT DOCUMENTS

| | | | |
|---|---|---|---|
| 8,274,788 B2* | 9/2012 | Yang | E05B 73/0082 |
| | | | 292/121 |
| 9,170,613 B2* | 10/2015 | Lan | G06F 1/1681 |
| 9,229,484 B2* | 1/2016 | Chen | G06F 1/166 |
| 2004/0111837 A1* | 6/2004 | Lallemant | G06F 1/1616 |
| | | | 16/297 |
| 2006/0056140 A1* | 3/2006 | Lev | E05C 19/163 |
| | | | 361/679.27 |
| 2006/0170223 A1* | 8/2006 | Homer | E05B 65/006 |
| | | | 292/102 |
| 2006/0256516 A1* | 11/2006 | Cho | G06F 1/1616 |
| | | | 361/679.29 |
| 2010/0053857 A1* | 3/2010 | Zhu | E05B 15/101 |
| | | | 361/679.01 |
| 2013/0092811 A1 | 4/2013 | Funk et al. | |
| 2013/0155583 A1* | 6/2013 | Yang | G06F 1/1626 |
| | | | 361/679.01 |
| 2014/0133080 A1* | 5/2014 | Hwang | G06F 1/1632 |
| | | | 361/679.17 |
| 2014/0321043 A1* | 10/2014 | Liu | G06F 1/1654 |
| | | | 361/679.29 |
| 2015/0131218 A1* | 5/2015 | Yeh | G06F 1/162 |
| | | | 361/679.07 |
| 2015/0153785 A1* | 6/2015 | Kao | G06F 1/1681 |
| | | | 361/679.55 |
| 2015/0192957 A1* | 7/2015 | Lee | G06F 1/1632 |
| | | | 361/679.58 |
| 2015/0253812 A1* | 9/2015 | Chen | G06F 1/166 |
| | | | 361/679.17 |
| 2016/0062411 A1* | 3/2016 | Morrison | G06F 1/1632 |
| | | | 361/679.08 |

* cited by examiner

CONNECTING ASSEMBLY AND ELECTRONIC DEVICE HAVING THE SAME

CROSS-REFERENCE TO RELATED APPLICATION

This application claims the priority benefits of U.S. provisional application Ser. No. 61/813,647, filed on Apr. 19, 2013. The entirety of the above-mentioned patent applications is hereby incorporated by reference herein and made a part of this specification.

BACKGROUND OF THE INVENTION

Field of the Invention

The invention relates to a connecting assembly and an electronic device having the connecting assembly; more particularly, the invention relates to a connecting assembly configured for a detachable electronic device and a detachable electronic device having the connecting assembly.

Description of Related Art

In this modern information society, touch modules have been used as input units for various electronic devices. Among them, touch display devices combining touch and display functions, such as tablet computers, have become most favorable products nowadays. However, since tablet computers are designed to be light, thin and compact so as to meet demands, functions and expandability thereof cannot be put on a par with desktop computers or notebook computers having relatively larger space.

In light of the foregoing, a docking station is introduced in the related art, such that tablet computers may be assembled to the docking station so as to expand functions thereof, such as a function of a standard keyboard. The tablet computer and the docking station usually are structured to be assembled together by a connecting assembly. Therefore, it is of importance to design the connecting assembly that allows the tablet computer to be stably assembled to the docking station.

SUMMARY OF THE INVENTION

The invention provides a connecting assembly. The connecting assembly is configured for an electronic device and may stably assemble two bodies of the electronic device.

The invention provides an electronic device having the aforesaid connecting assembly, which may stably assemble two bodies of the electronic device.

A connector assembly of the invention is adapted for an electronic device. The electronic device includes a first body and a second body. The connecting assembly is disposed between two opposite assembling sides of the first body and the second body, such that the first body may be detachably assembled to the second body. The connecting assembly includes an engaging member, an engaging portion and an elastic fixing mechanism. The engaging member is pivoted to the first body and the engaging portion is fixed to the second body. The elastic fixing mechanism is connected to the first body. When the first body is assembled to the second body, the engaging member rotates relative to the engaging portion from a first position to a second position, such that the engaging member is infixed to the engaging portion and the second body. Then, elastic force of the elastic fixing mechanism fixes the engaging member together with the engaging portion and the second body, such that the first body is assembled to the second body. When the first body is disassembled from the second body, the engaging member overcomes the elastic force and rotates from the second position to the first position, such that the first body is disassembled from the second body.

An electronic device of the invention includes a first body, a second body and at least one connecting assembly. The at least one connecting assembly is disposed between two opposite assembling sides of the first body and the second body, such that the first body is detachably assembled to the second body. The at least one connecting assembly includes an engaging member, an engaging portion and an elastic fixing mechanism. The engaging member is pivoted to the first body and the engaging portion is fixed to the second body. The elastic fixing mechanism is connected to the first body. When the first body is assembled to the second body, the engaging member rotates relative to the engaging portion from a first position to a second position, such that the engaging member is infixed to the engaging portion and the second body. Then, elastic force of the elastic fixing mechanism fixes the engaging member together with the engaging portion and the second body, such that the first body is assembled to the second body. When the first body is disassembled from the second body, the engaging member overcomes the elastic force and rotates from the second position to the first position, such that the first body is disassembled from the second body.

In an embodiment of the invention, the engaging member is a polygon. When the first body is assembled to the second body, the engaging member rotates from the first position to the second position, such that two of adjacent sides of the engaging member are infixed with one side of the engaging portion and the second body, respectively.

In an embodiment of the invention, the elastic fixing mechanism is a spring. One end of the spring is fixed to the first body, while the other end thereof is located next to the engaging member. When the first body is assembled to the second body, the engaging member rotates from the first position to the second position, and the spring presses against the engaging member so as to fix the engaging member together with the engaging portion and the second body.

In an embodiment of the invention, the elastic fixing mechanism includes an elastic member and a positioning member. The elastic member is connected between the positioning member and the first body. When the first body is assembled to the second body, the engaging member rotates from the first position to the second position, and the elastic member presses against the positioning member, such that the positioning member, the engaging portion and the second body together fix the engaging member so as to fix the engaging member.

In an embodiment of the invention, the elastic fixing mechanism includes an elastic clip and a positioning member. The elastic clip is fixed to the engaging member, while the positioning member is fixed to the first body. When the first body is assembled to the second body, the engaging member rotates from the first position to the second position, and the elastic clip holds the positioning member to fix the engaging member.

In an embodiment of the invention, the positioning member is a polygon, and the elastic clip holds sides of the polygon.

In an embodiment of the invention, the elastic fixing mechanism includes a plurality of springs and a positioning member. The plurality of springs are fixed to the engaging member, while the positioning member is fixed to the first body. When the first body is assembled to the second body, the engaging member rotates from the first position to the second position, and the springs together hold the positioning member so as to fix the engaging member.

In an embodiment of the invention, the positioning member is a polygon, and the spring presses against a plurality of sides of the polygon so as to hold the positioning member together.

In an embodiment of the invention, a quantity of the connecting assembly is two, and the connecting assemblies are located at two opposite sides of the electronic device, respectively.

In view of the foregoing, the first body and the second body of the electronic device are assembled to each other by means of rotating the engaging member of the connecting assembly and then infixing the first body with the second body. Moreover, the elastic force generated by the elastic fixing mechanism of the connecting assembly is also implemented to fix the engaging member. Thereby, the first body and the second body may be stably fixed together.

To make the aforesaid features and advantages of the invention more comprehensible, several embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
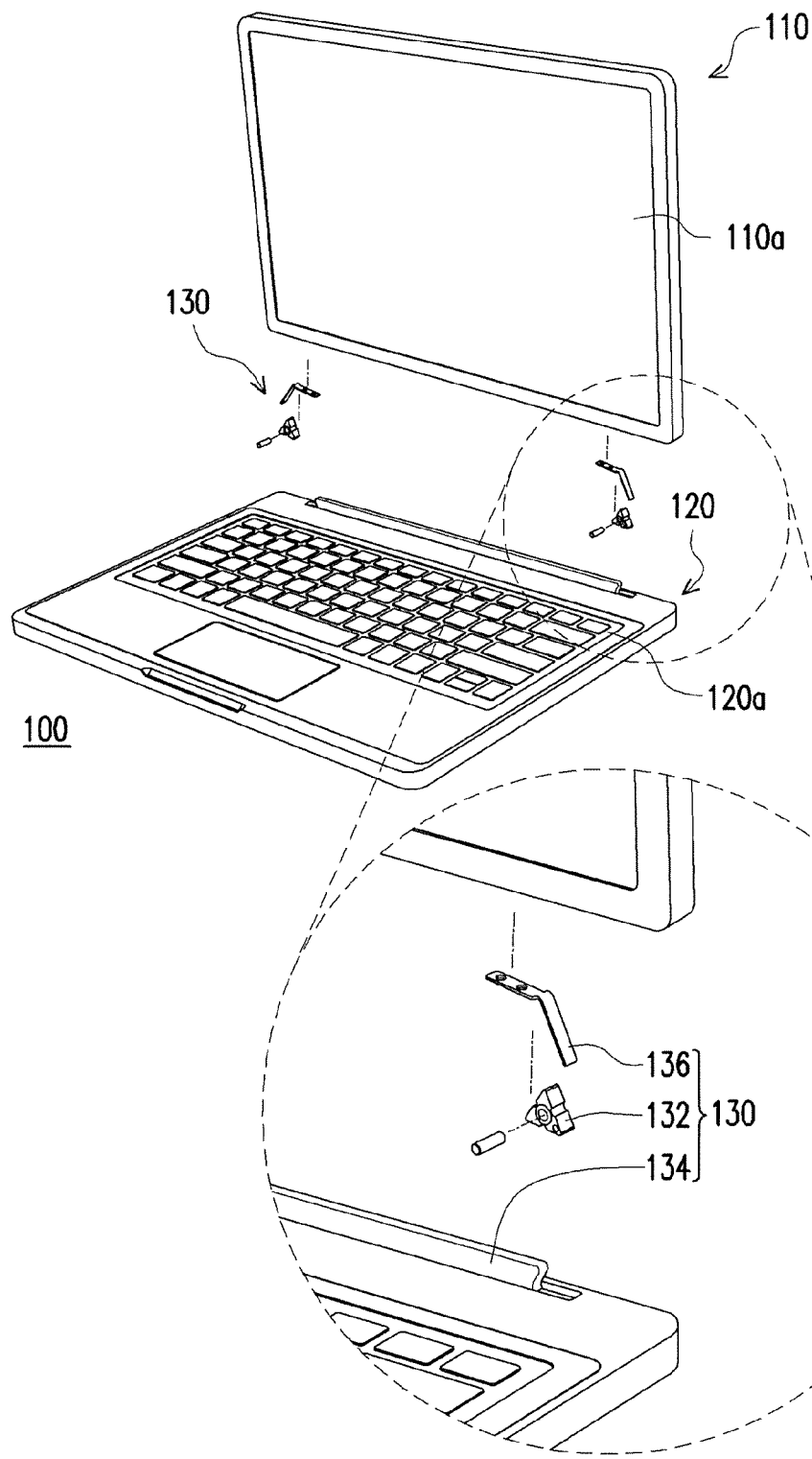
FIG. 1A is a partial exploded view illustrating an electronic device according to an embodiment of the invention.
Figure 1B:
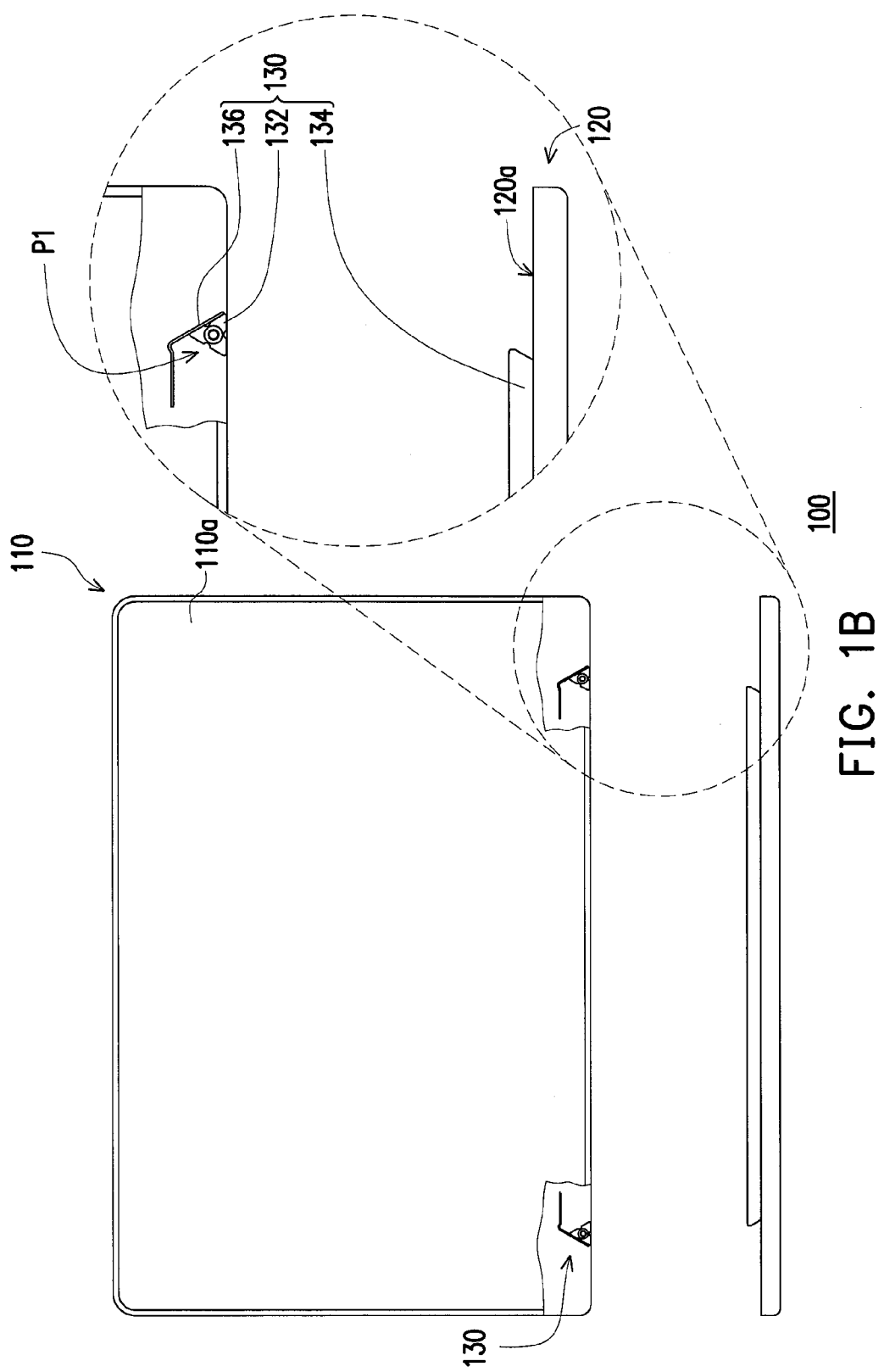
FIG. 1B is a front view of the electronic device of FIG. 1A.

FIG. 1A is a partial exploded view illustrating an electronic device according to an embodiment of the invention. FIG. 1B is a front view of the electronic device of FIG. 1A. In order to illustrate internal components of an electronic device 100 clearly, some components are omitted in the front view of FIG. 1B. With reference to FIG. 1A and FIG. 1B, the electronic device 100 includes a first body 110, a second body 120 and two connecting assemblies 130. The connecting assembly 130 is disposed between two opposite assembling sides of the first body 110 and the second body 120, such that the first body 110 is detachably assembled to the second body 120.

FIG. 1A and FIG. 1B illustrate that the first body 110 is not assembled to the second body 120 yet. In the present embodiment, the first body 110 is, for example, a tablet computer, while the second body 120 is, for example, a docking station. Here, the first body 110 has a display surface 110a (e.g., a display surface of a flat panel display), while the second body 120 has an input surface 120a (e.g., an input surface of a standard keyboard). After the first body 110 is assembled to the second body 120, a user may see images on the display surface 110a of the first body 110 and use the input surface 120a of the second body 120 as a primary operating surface.

The present embodiment is illustrated by taking an example of the electronic device 100 having two connecting assemblies 130, and the two connecting assemblies 130 are located at two opposite sides of the electronic device 100, respectively. In other embodiments, the electronic device 100 may include only one connecting assembly 130, which also allows the first body 110 to be detachably assembled to the second body 120. In addition, the two connecting assemblies 130 of the electronic device 100 substantially include the same components. One of the connecting assemblies 130 (e.g., the connecting assembly 130 on the right side of FIG. 1A) is illustrated to exemplify the invention.

The connecting assembly 130 includes an engaging member 132, an engaging portion 134 and an elastic fixing mechanism 136. The engaging member 132 is pivoted to the first body 110 and the engaging portion 134 is fixed to the second body 120. The elastic fixing mechanism 136 is connected to the first body 110. As illustrated in FIG. 1B, when the first body 110 is not assembled to the second body 120 yet, the engaging member 132 is located relative to the engaging portion 134 at a first position P1.

The elastic fixing mechanism 136 of the present embodiment is a spring. One end of the spring is fixed to the first body 110, while the other end thereof is located next to the engaging member 132. In addition, the engaging member 132 of the present embodiment is shaped as a triangle. When the engaging member 132 is located relative to the engaging portion 134 at the first position P1, the spring presses against one of sides of the triangle.

Figure 1C:
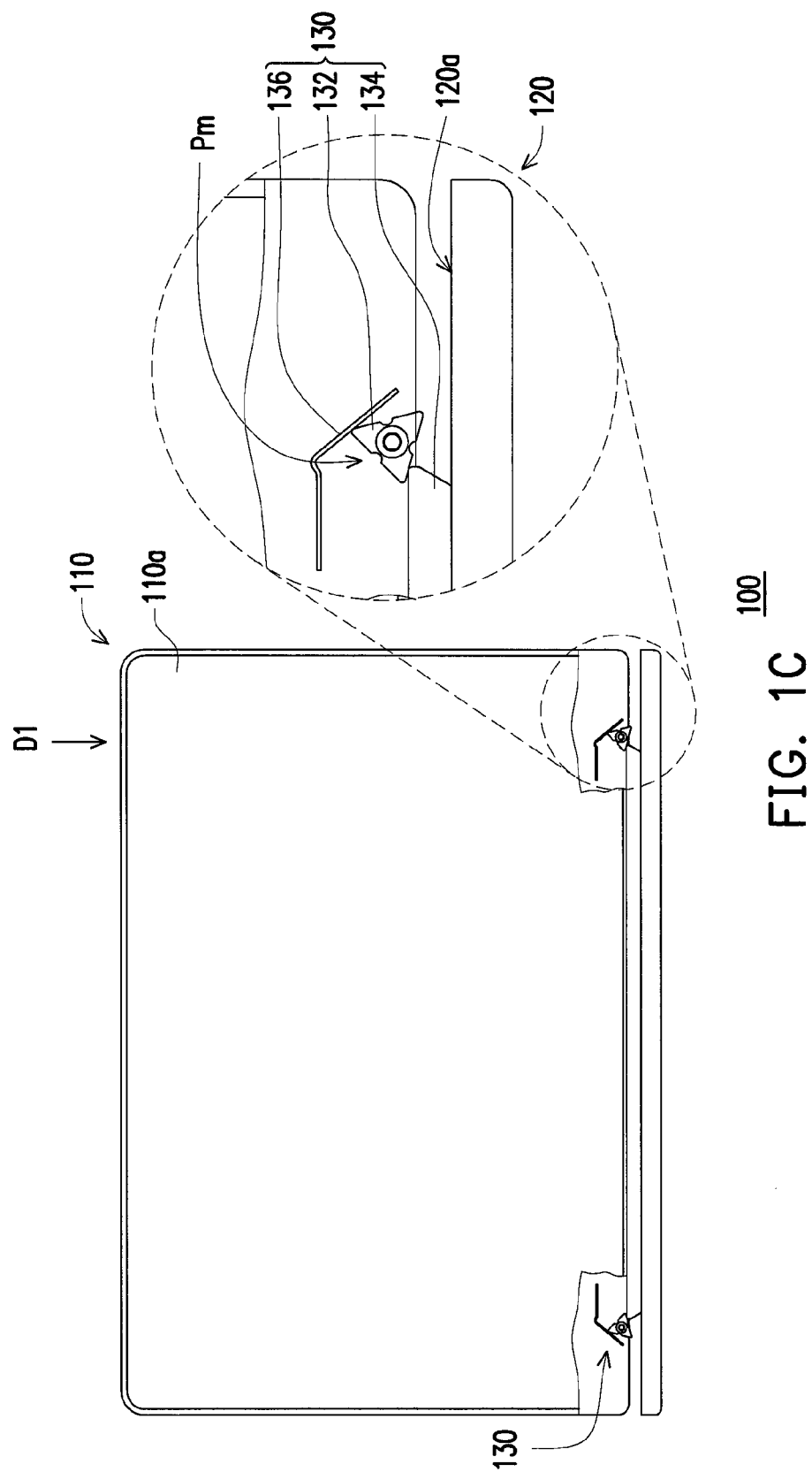
FIG. 1C illustrates that the first body depicted in FIG. 1B approaches the second body.

FIG. 1C illustrates that the first body depicted in FIG. 1B approaches the second body. With reference to FIG. 1C, when a user needs to assemble the first body 110 to the second body 120, the first body 110 may approach the second body 120 along an assembling direction D1 (e.g., parallel to a direction of the display surface 110a). Furthermore, force is applied to the first body 110 for the engaging member 132 to be in contact with the engaging portion 134.

At this time, the engaging portion 134 pushes the engaging member 132, and the engaging member 132 pushes the elastic fixing mechanism 136. Thereby, the engaging member 132 rotates relative to the engaging portion 134 from the first position P1 as shown in FIG. 1B to a middle position Pm.

Figure 1D:
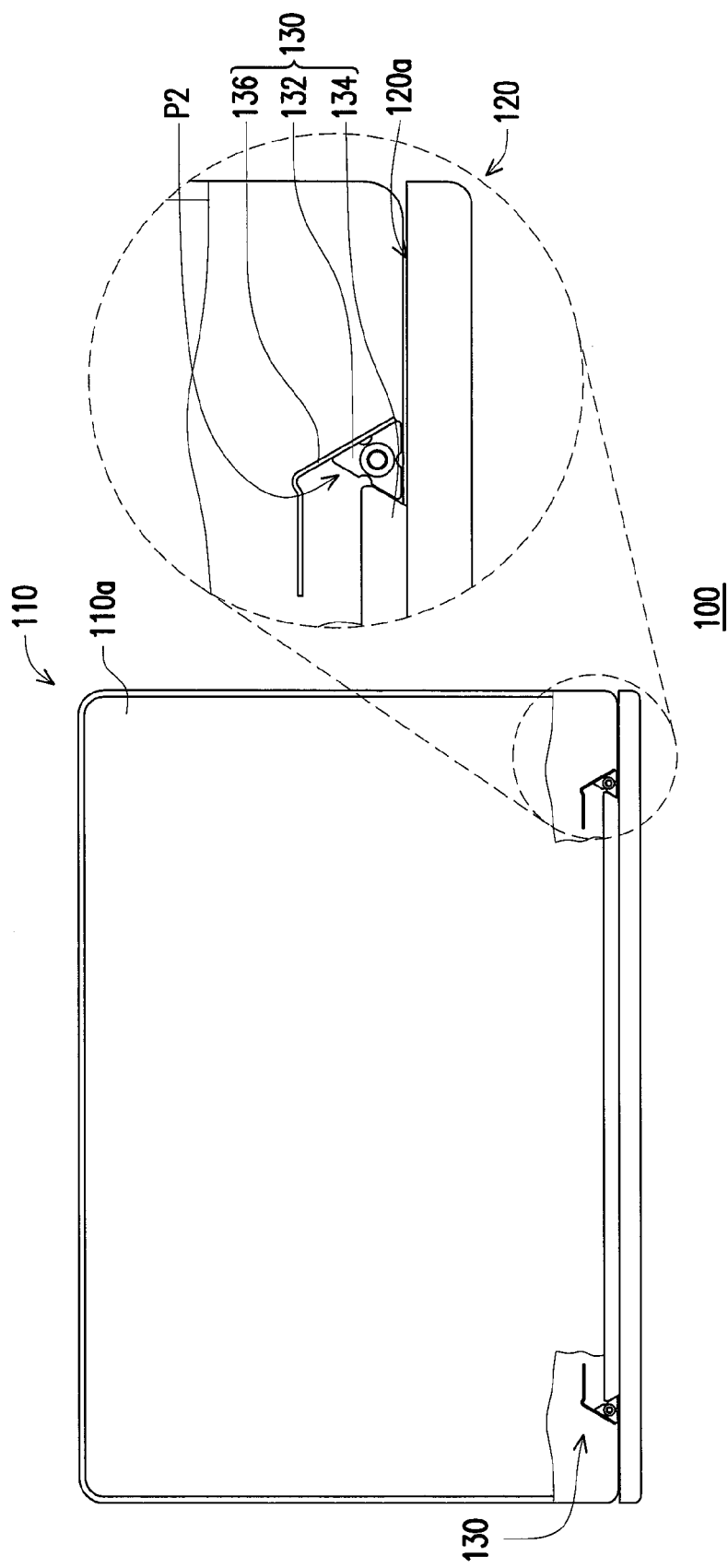
FIG. 1D illustrates that the first body depicted in FIG. 1C is assembled to the second body.

FIG. 1D illustrates that the first body depicted in FIG. 1C is assembled to the second body. With reference to FIG. 1D, the first body 110 then completely leans on the second body 120. At this time, the engaging member 132 rotates relative to the engaging portion 134 to a second position P2, such that the engaging member 132 is infixed to the engaging portion 134 and the second body 120. Then, elastic force of the elastic fixing mechanism 136 fixes the engaging member 132 together with the engaging portion 134 and the second body 120. As illustrated in FIG. 1D, when the first body 110 is assembled to the second body 120, the elastic fixing mechanism 136 presses against the engaging member 132 so as to fix the engaging member 132 together with the engaging portion 134 and the second body 120.

When the user intends to disassemble the first body 110 from the second body 120, the user may reverse the aforesaid assembling process. Specifically, when the first body 110 is disassembled from the second body 120, the first body is moved away from the second body 120 along the assembling direction D1. In addition, the user may apply force on the first body 110 for the engaging member 132 to overcome the elastic force generated by the elastic fixing mechanism 136 and reverse a rotation from the second position P2 depicted in FIG. 1D to the mid position Pm depicted in FIG. 1C. Next, the user may continue applying force for the first body 110 to move toward a direction away from the second body 120. Thereby, the engaging member 132 rotates continually from the middle position Pm depicted in FIG. 1C back to the first position P1 depicted in FIG. 1B.

Figure 1E:
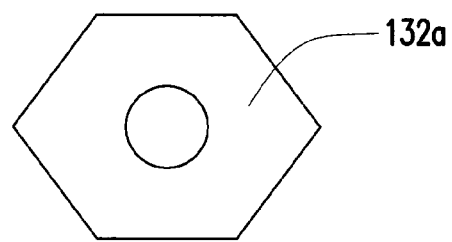
FIG. 1E to FIG. 1H illustrate multiple embodiments of the engaging member.
Figure 1F:
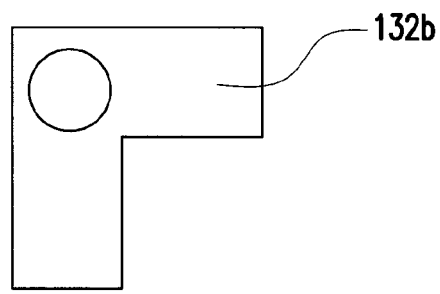
Figure 1G:
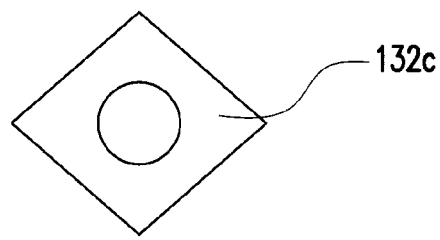
Figure 1H:
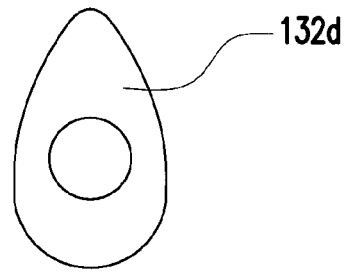

It should be noted that the present embodiment is illustrated with the engaging member 132 in a triangle shape. When the first body 110 is assembled to the second body 120, two adjacent sides of the triangle are infixed to one side of the engaging portion 134 and the second body 120, such that the engaging member 132 may be stably fixed to the second body 120. In other embodiments, the engaging member 132 may be in other polygons. FIGS. 1E to 1H illustrate multiple embodiments of the engaging member. An engaging member 132a depicted in FIG. 1E is a hexagon. An engaging member 132b depicted in FIG. 1F is in an L shape. An engaging member 132c depicted in FIG. 1G is a quadrangle. An engaging member 132d depicted in FIG. 1H is in another shape having two bevels. Particularly, as long as a component has two bevels which may be infixed to one side of the engaging portion 134 and the second body 120, respectively, this component may serve as an engaging member.

In the present embodiment, the first body 110 and the second body 120 of the electronic device 100 are assembled to each other by means of rotating the engaging member 132 of the connecting assembly 130 and engaging the first body 110 with the second body 120. Moreover, the elastic force generated by the elastic fixing mechanism 136 of the connecting assembly 130 is also implemented to fix the engaging member 132. Thereby, the first body 110 and the second body 120 may be stably fixed together. Additionally, when the first body 110 is assembled to or disassembled from the second body 120, the first body 110 is handled straight up or down along the same assembling direction D1, such that the two bodies are assembled to or disassembled from each other in a simple and fast manner.

The connecting assembly may be illustrated in various embodiments according to designs for the elastic fixing mechanism. Each connecting assembly in each embodiment is described below with reference to drawings.

The following embodiments use the reference numerals and parts of the contents of the aforesaid embodiments, wherein same reference numerals are adopted to represent the same or similar elements, and repetitive explanations of the same technical content is omitted. Concerning the omitted illustrations, please refer to the aforesaid embodiments. The same technical content is not reiterated in the following embodiments.

Figure 2A:
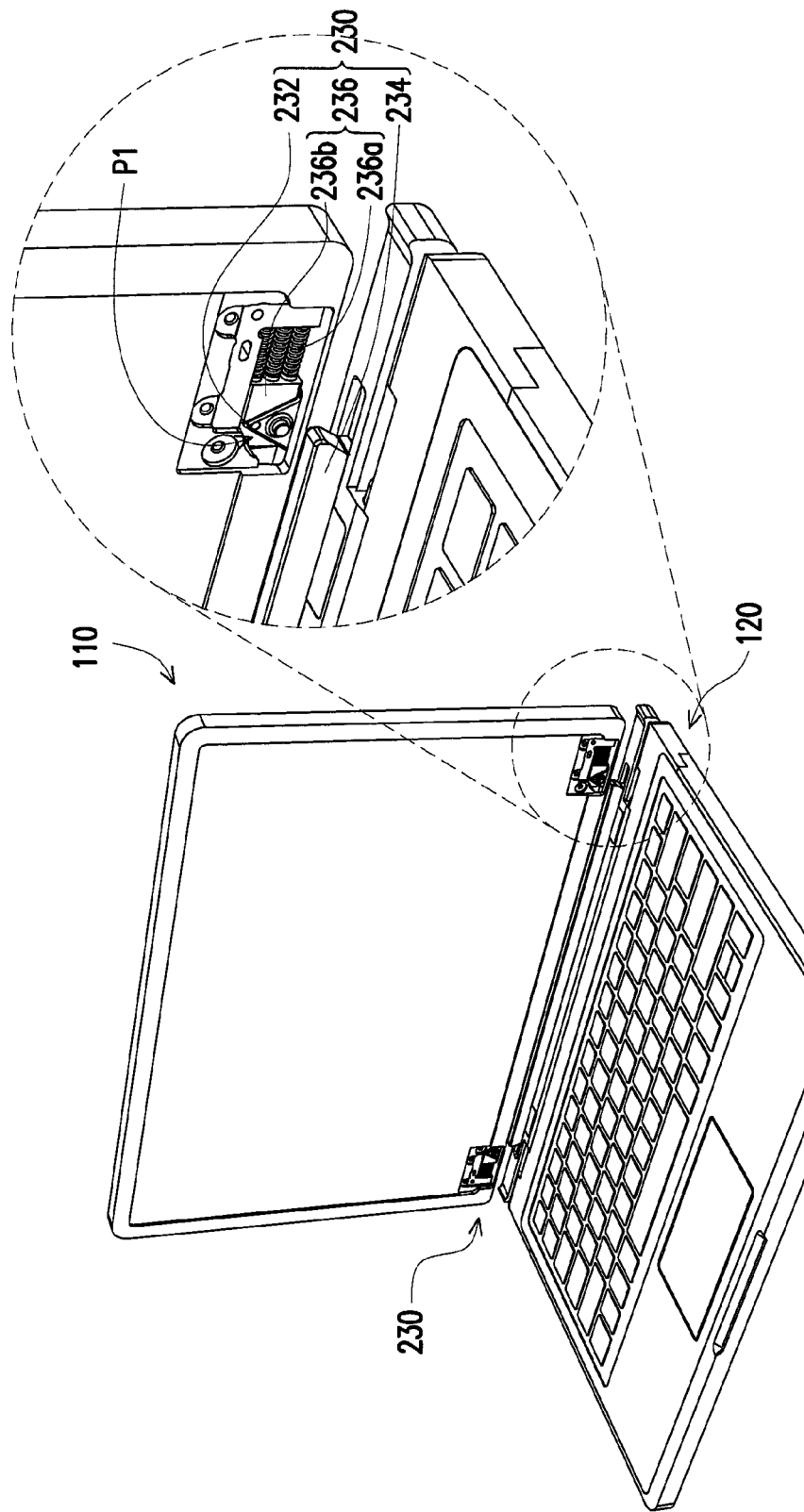
FIG. 2A is a schematic perspective view illustrating an electronic device according to another embodiment of the invention.

FIG. 2A is a schematic perspective view illustrating an electronic device according to another embodiment of the invention. In order to illustrate internal components of an electronic device 200 clearly, some components are omitted in the schematic perspective view of FIG. 2A. With reference to FIG. 2A, the electronic device 200 includes a first body 110, a second body 120 and two connecting assemblies 230. Each of the connecting assemblies 230 is disposed between the second body 120 and the first body 110, such that the second body 120 is detachably assembled to the first body 110. The two connecting assemblies 230 of the electronic device 200 substantially include the same components. One of the connecting assemblies 230 (e.g., the connecting assembly 230 on the right side of FIG. 2A) is illustrated to exemplify the invention.

The connecting assembly 230 includes an engaging member 232, an engaging portion 234 and an elastic fixing mechanism 236. The engaging member 232 is pivoted to the first body 110 and the engaging portion 234 is fixed to the second body 120. The elastic fixing mechanism 236 is connected to the first body 110. In the present embodiment, the elastic fixing mechanism 236 includes an elastic member 236a and a positioning member 236b, wherein the elastic member 236a is connected between the positioning member 236b and the first body 110. FIG. 2A illustrates that the first body 110 is not assembled to the second body 120 yet. As illustrated in FIG. 2A, when the first body 110 is not assembled to the second body 120 yet, the engaging member 232 is located relative to the engaging portion 234 at the first position P1. Here, the positioning member 236b presses against one of sides of the engaging member 232.

Figure 2B:
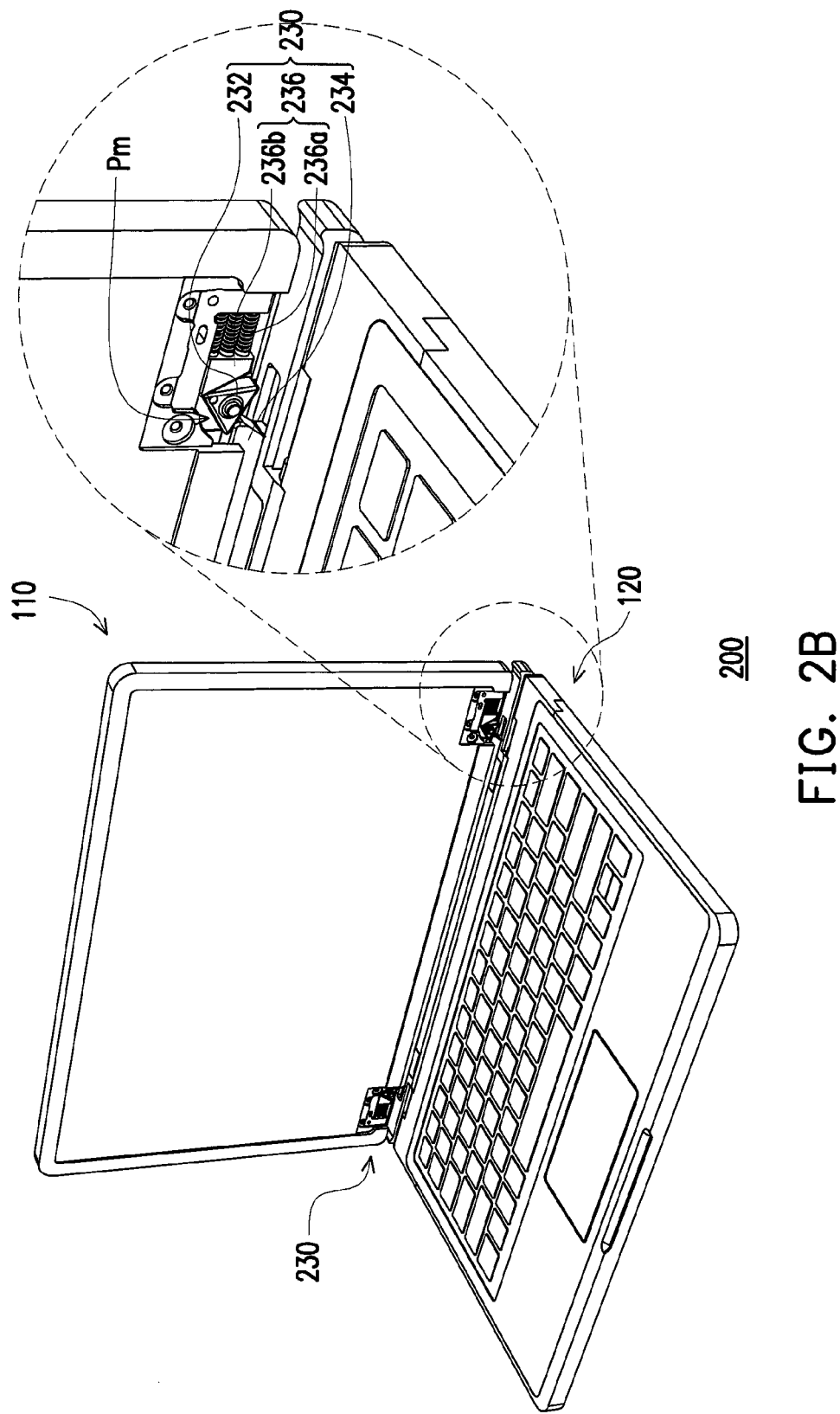
FIG. 2B illustrates that the first body depicted in FIG. 2A approaches the second body.

FIG. 2B illustrates that the first body 110 depicted in FIG. 2A approaches the second body 120. With reference to FIG. 2B, when a user needs to assemble the first body 110 to the second body 120, the user may apply force on the first body 110 for the engaging portion 234 to be in contact with the engaging member 232. At this time, the engaging portion 234 pushes the engaging member 232, and the engaging member 232 pushes the positioning member 236b and compresses the elastic member 236a. Thereby, the engaging member 232 rotates relative to the engaging portion 234 from the first position P1 as shown in FIG. 1B to the middle position Pm.

Figure 2C:
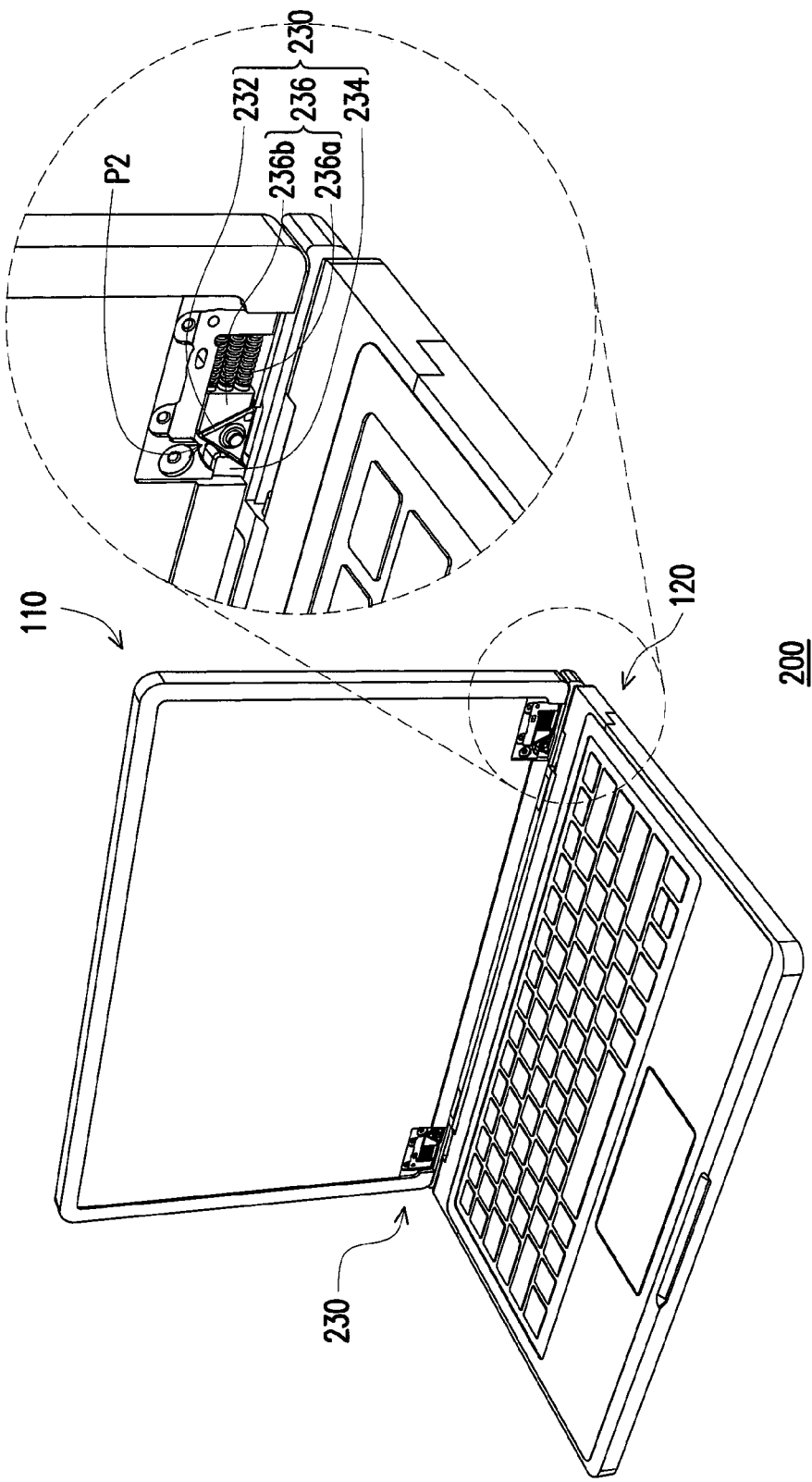
FIG. 2C illustrates that the first body depicted in FIG. 2B is assembled to the second body.

FIG. 2C illustrates that the first body 110 depicted in FIG. 2B is assembled to the second body 120. With reference to FIG. 2C, the first body 110 then completely leans on the second body 120. At this time, the engaging member 232 rotates relative to the engaging portion 234 to the second position P2, such that the engaging member 232 is infixed to the engaging portion 234 and the second body 120. When the engaging member 232 rotates to the second position P2, the elastic member 236a is released to press against the positioning member 236b, such that the positioning member 236b, the engaging portion 234 and the second body 120 together hold the engaging member 232 so as to fix the engaging member 232.

Figure 3A:
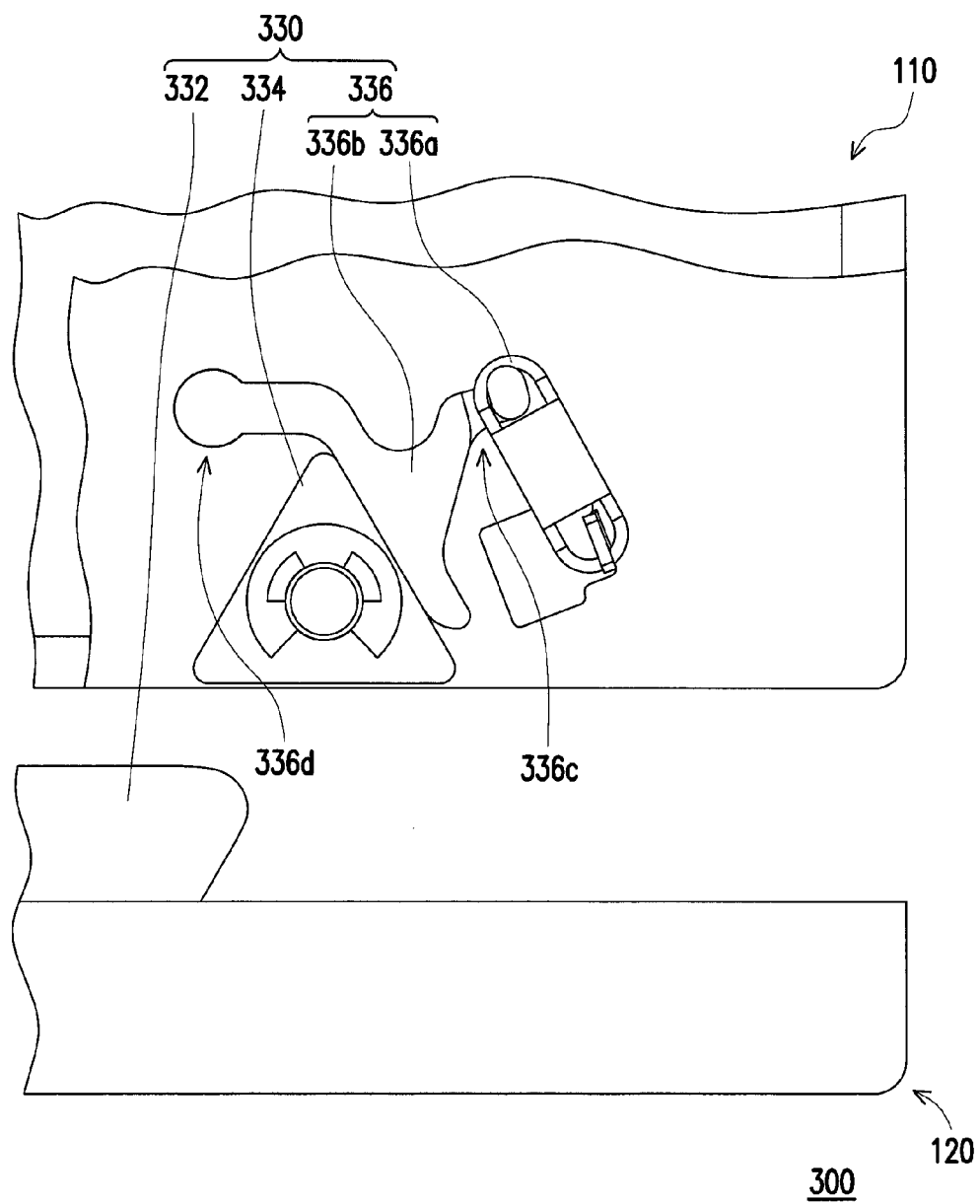
FIG. 3A is a partial view illustrating an electronic device according to another embodiment of the invention.
Figure 3B:
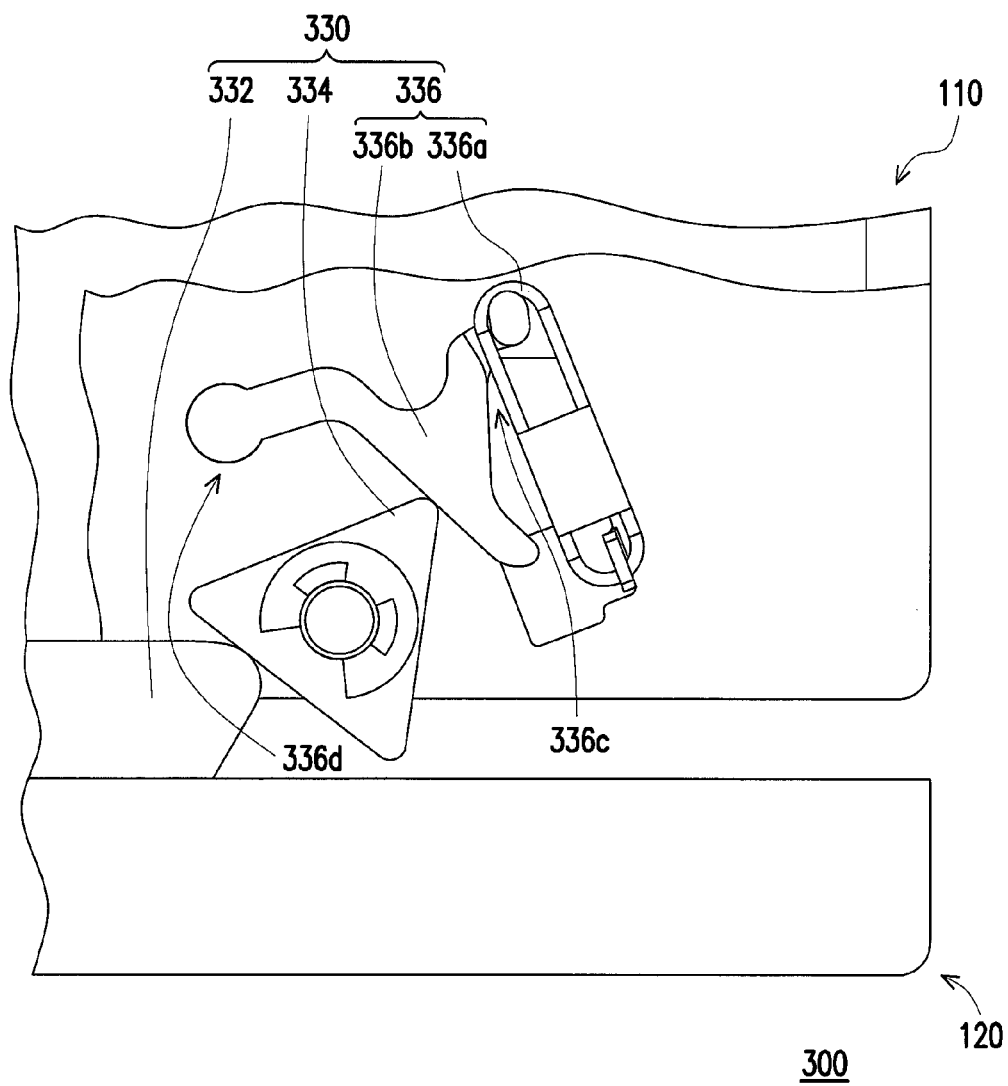
FIG. 3B illustrates that the first body depicted in FIG. 3A approaches the second body.
Figure 3C:
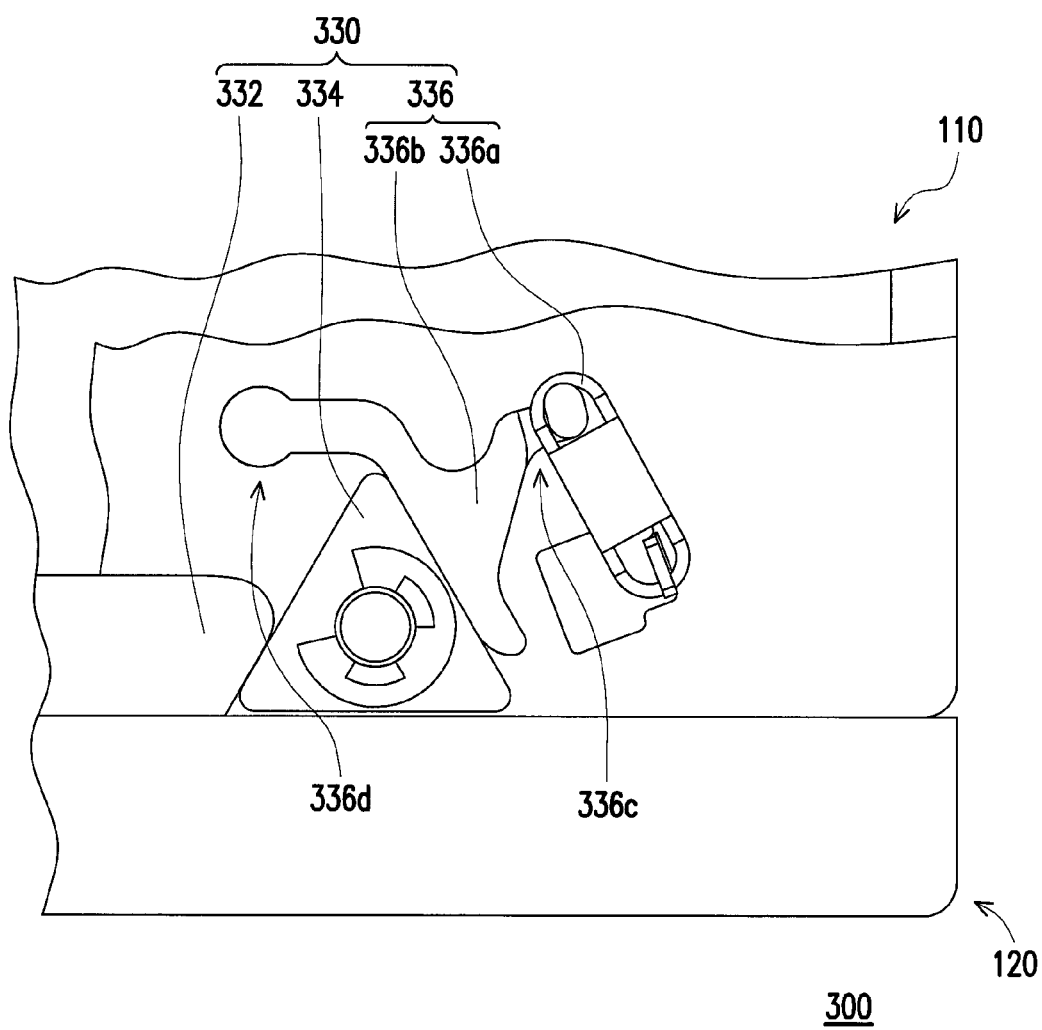
FIG. 3C illustrates that the first body depicted in FIG. 3B is assembled to the second body.

FIG. 3A is a partial view illustrating an electronic device according to another embodiment of the invention. An embodiment depicted in FIG. 3A is substantially similar to the embodiment depicted in FIG. 2A. A primary difference therebetween lies in designs for an elastic member and a positioning member. With reference to FIG. 3A, an elastic fixing mechanism 336 of the present embodiment includes an elastic member 336a and a positioning member 336b. The elastic member 336a is connected between the positioning member 336b and the first body 110. Here, one end 336c of the positioning member 336b is connected to the elastic member 336a, while the other end 336d thereof is pivoted to the first body 110. FIG. 3B illustrates that the first body depicted in FIG. 3A approaches the second body. When the first body 110 approaches the second body 120, an engaging member 332 rotates relative to an engaging portion 334. At this time, the engaging member 332 pushes the positioning member 336b for the positioning member 336b to rotate, and the positioning member 336b applies force on the elastic member 336a to stretch the elastic member 336a. FIG. 3C illustrates that the first body depicted in FIG. 3B is assembled to the second body. When the first body 110 is assembled to the second body 120, the elastic member 336a is released to fix the positioning member 336b.

Figure 4A:
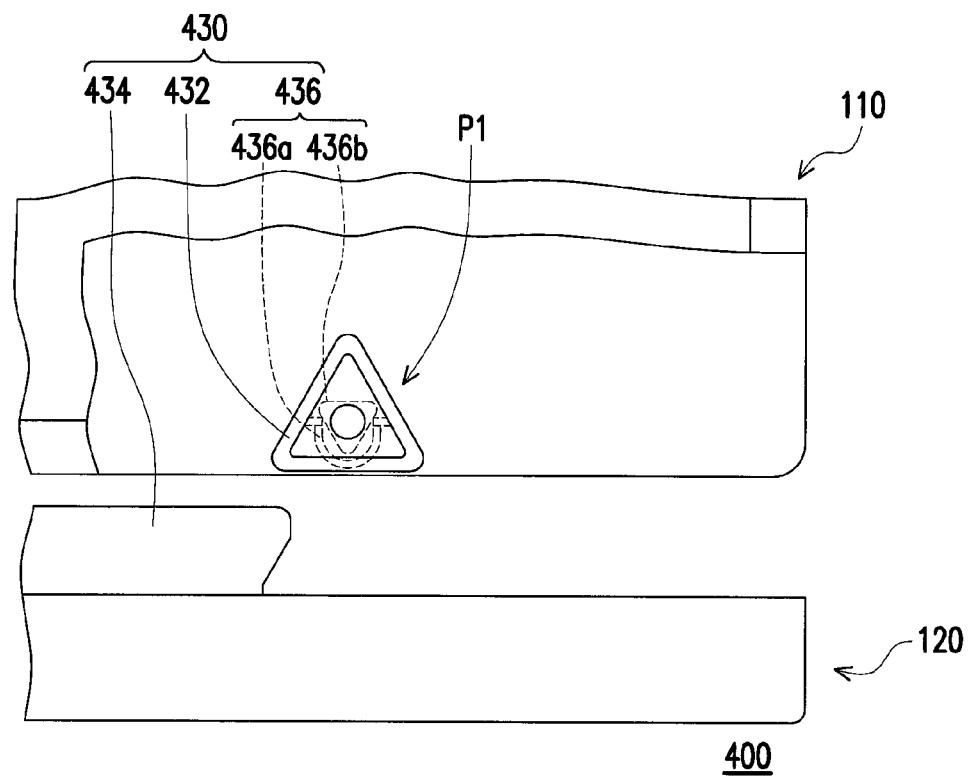
FIG. 4A is a partial perspective view illustrating an electronic device according to another embodiment of the invention.

FIG. 4A is a partial perspective view illustrating an electronic device according to another embodiment of the invention. With reference to FIG. 4A, in the present embodiment, an elastic fixing mechanism 436 of a connecting assembly 430 includes an elastic clip 436a and a positioning member 436b. The elastic clip 436a is fixed to the engaging member 432, while the positioning member 436b is fixed to the first body 110. FIG. 4A illustrates that the first body is not assembled to the second body yet. As illustrated in FIG. 4A, when the first body 110 is not assembled to the second body 120 yet, the engaging member 432 is located relative to the engaging portion 434 at the first position P1. At this time, the elastic clip 436a holds the positioning member 436b, so as to fix the engaging member 432 relative to the first body 110.

Figure 4B:
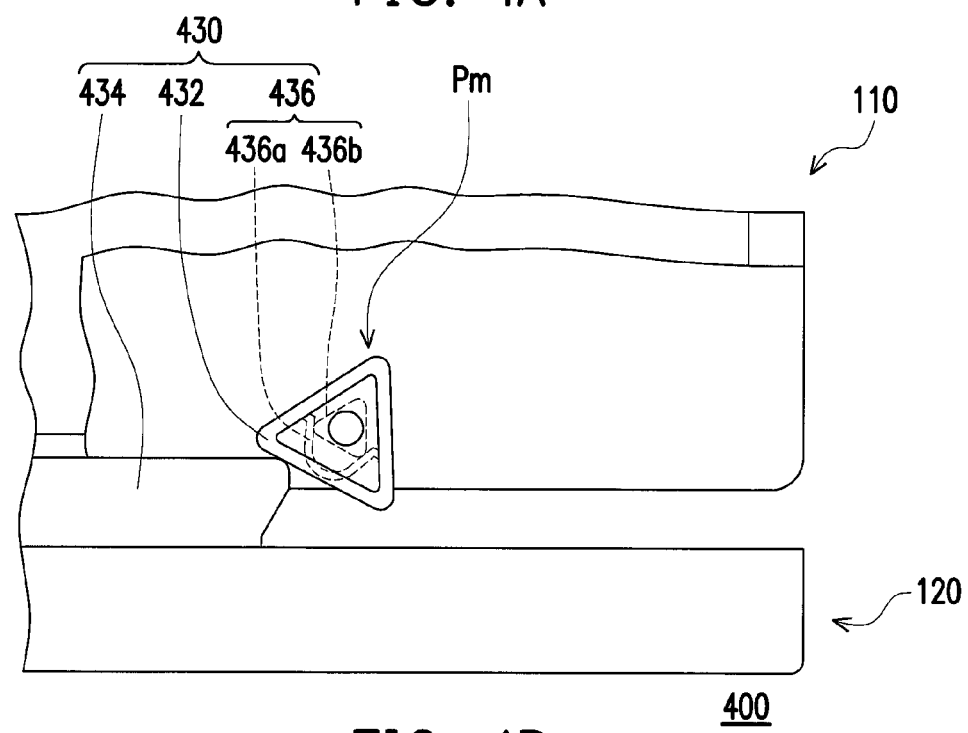
FIG. 4B illustrates that the first body depicted in FIG. 4A approaches the second body.
Figure 4C:
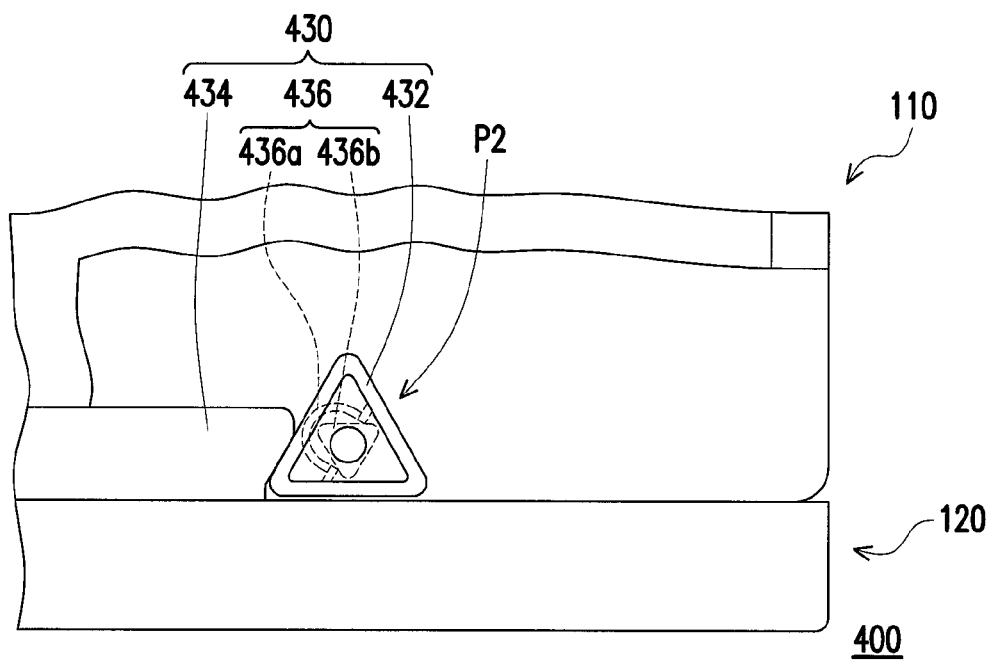
FIG. 4C illustrates that the first body depicted in FIG. 4B is assembled to the second body.

FIG. 4B illustrates that the first body depicted in FIG. 4A approaches the second body. With reference to FIG. 4B, when the first body 110 approaches the second body 120, the engaging portion 434 is in contact with the engaging member 432 and pushes the engaging member 432 to rotate from the first position P1 depicted in FIG. 4A to the middle position Pm depicted in FIG. 4B. As shown in FIG. 4B, at this time, the elastic clip 436a rotates with the engaging member 432 and is retracted by the positioning member 436b. FIG. 4C illustrates that the first body depicted in FIG. 4B is assembled to the second body. Then, the first body 110 completely leans on the second body 120. At this time, the engaging member 432 rotates relative to the engaging portion 434 to the second position P2, such that the engaging member 432 is infixed to the engaging portion 434 and the second body 120, and the elastic clip 436a holds the positioning member 436b so as to fix the engaging member 432.

In the present embodiment, both the engaging member 432 and the positioning member 436b are triangles, and the elastic clip 436a holds a side of the positioning member 436b. Certainly, the invention is not limited herein. As illustrated in the aforesaid embodiments, the engaging member 432 or the positioning member 436b may be other polygons. In addition, in the present embodiment, both the elastic clip 436a and the positioning member 436b are located inside the engaging member 432 and thereby the invention has an advantage of effective space utilization.

Figure 5A:
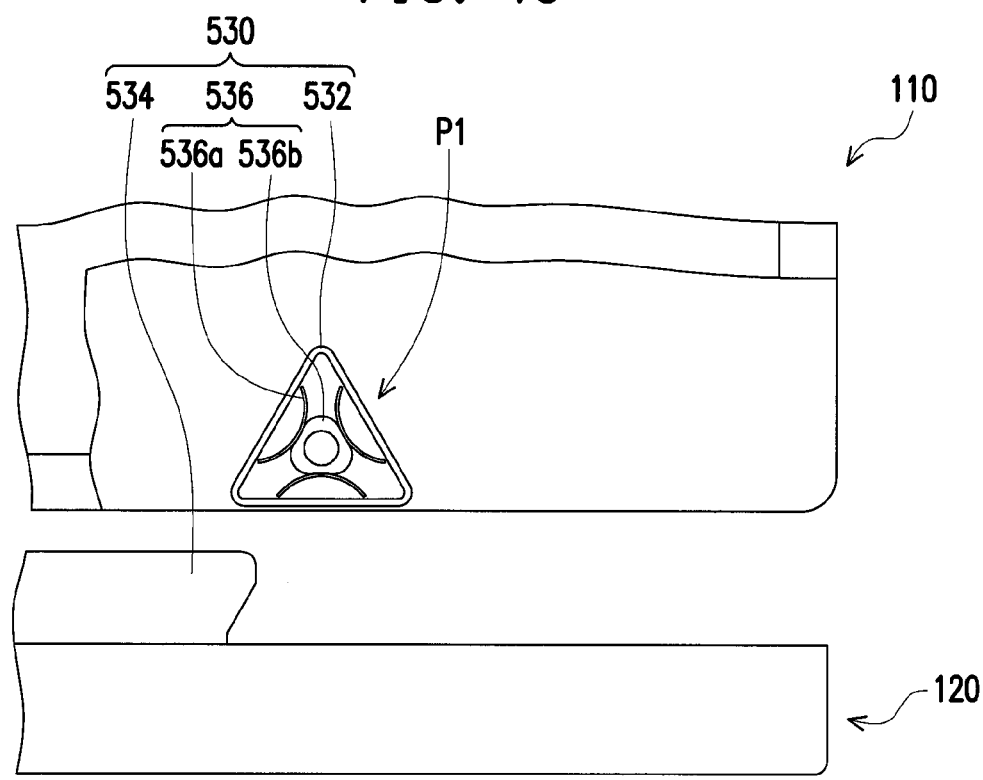
FIG. 5A is a partial view illustrating an electronic device according to another embodiment of the invention.

FIG. 5A is a partial view illustrating an electronic device according to another embodiment of the invention. With reference to FIG. 5A, an elastic fixing mechanism 536 of the present embodiment includes a plurality of springs 536a and a positioning member 536b. The springs 536a are fixed to the engaging member 532, while the positioning member 536b is fixed to the first body 110. FIG. 5A illustrates that a first body is not assembled to a second body yet. As illustrated in FIG. 5A, when the first body 110 is not assembled to the second body 120 yet, the engaging member 532 is located relative to the engaging portion 534 at the first position P1. At this time, the springs 536a together hold the positioning member 536b so as to fix the engaging member 532.

Figure 5B:
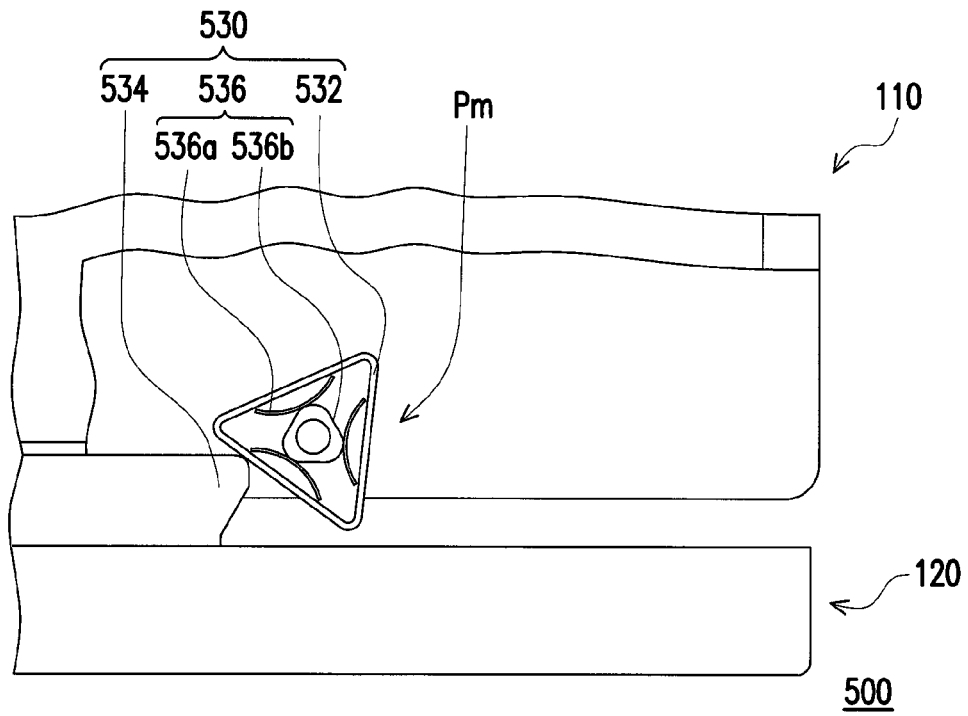
FIG. 5B illustrates that the first body depicted in FIG. 5A approaches the second body.
Figure 5C:
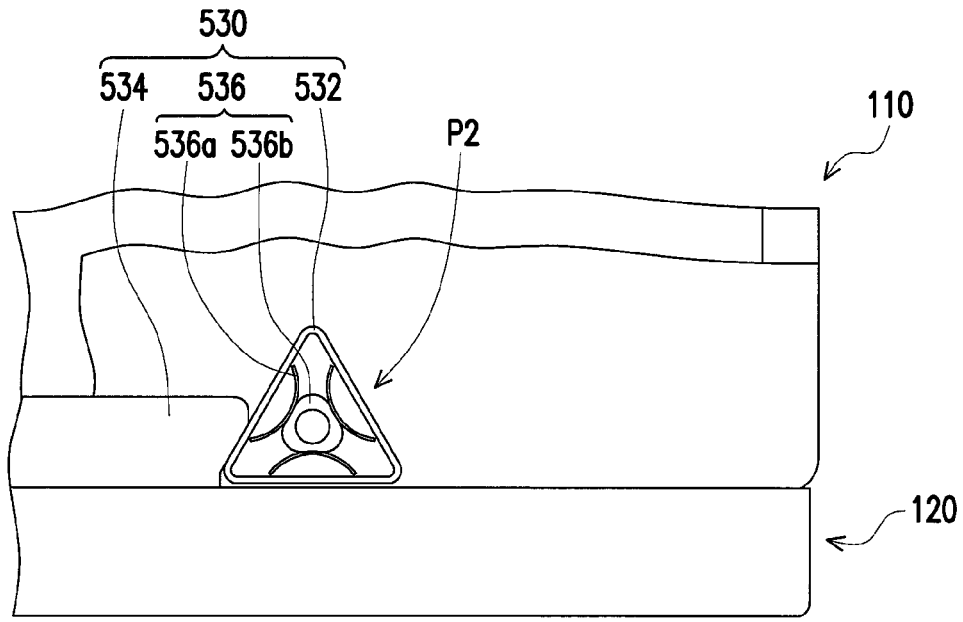
FIG. 5C illustrates that the first body depicted in FIG. 5B is assembled to the second body.

FIG. 5B illustrates that the first body depicted in FIG. 5A approaches the second body. When a user needs to assemble the first body 110 to the second body 120, the user may, apply force on the first body 110 for the engaging member 532 to be in contact with the engaging portion 534. At this time, the engaging member 532 rotates to the middle position Pm, while the springs 536a are retracted by the positioning member 536b, respectively. FIG. 5C illustrates that the first body depicted in FIG. 5B is assembled to the second body. When the first body 110 is assembled to the second body 120, the engaging member 532 rotates from the first position P1 depicted in FIG. 5A to the second position P2, and the springs 536a together hold the positioning member 536b so as to fix the engaging member 532.

Figure 6:
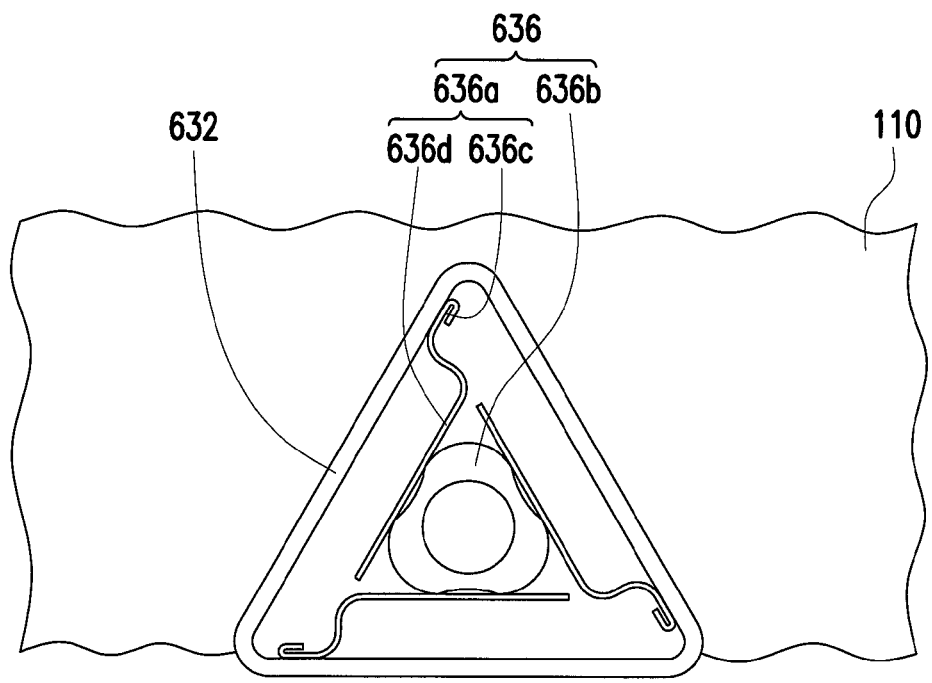
FIG. 6 is a partial view illustrating an electronic device according to another embodiment of the invention.

FIG. 6 is a partial view illustrating an electronic device according to another embodiment of the invention. An embodiment depicted in FIG. 6 is substantially similar to the embodiment depicted in FIG. 5A. A primary difference therebetween lies in designs for an elastic member. In the embodiment illustrated in FIG. 5A, each of the springs 536a is in an arc shape. When the springs 536a together hold the positioning member 536b, top sections of each of the arc-shaped springs 536a press against the engaging member 532. With reference to FIG. 6, an elastic fixing mechanism 636 includes a plurality of springs 636a and a positioning member 636b. The springs 636a are fixed to the engaging member 632, while the positioning member 636b is fixed to the first body 110. Each of the springs 636a includes a bending portion 636c and a pressing portion 636d extended from the bending portion 636c. When the springs 636a together hold the positioning member 636b, each of the pressing portions 636d of the springs 636a presses against the positioning member 636b.

It is worth to note that, in the embodiments illustrated in FIG. 5A and FIG. 6, the engaging member 532, the engaging member 632, the positioning member 536b and the positioning member 636b are triangles, and the plurality of springs 536a and 636a press against three sides of the triangles, respectively, so as to hold the corresponding positioning member 536b and 636b. Certainly, the invention is not limited herein. As illustrated in the aforesaid embodiments, the engaging member or the positioning member may be other polygons. Furthermore, when a quantity of sides of the engaging member increases, a quantity of the springs is also increased to stably hold the positioning member.

In summary, the first body and the second body of the electronic device are assembled to each other by means of rotating the engaging member of the connecting assembly and then engaging the first body with the second body. Moreover, the elastic force generated by the elastic fixing mechanism of the connecting assembly is also implemented to fix the engaging member. Thereby, the first body and the second body may be stably fixed together. Furthermore, when the first body is assembled to or disassembled from the second body, the first body is handled straight up or down along the same assembling direction, such that the two bodies are assembled to or disassembled from each other in a simple and fast manner. Additionally, the elastic fixing mechanism has various structures, such that the electronic device may be designed in great potentials.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An electronic device, comprising:
    a first body;
    a second body; and
    at least one connecting assembly disposed between two opposite assembling sides of the first body and the second body, such that the first body is detachably assembled to the second body, the connecting assembly comprising:
        an engaging member pivoted to the first body to rotate relative to the first body;
        an engaging portion fixed to the second body; and
        an elastic fixing mechanism connected to the first body, wherein when the first body is assembled to the second body, the engaging member rotates relative to the engaging portion from a first position to a second position, such that the engaging member is infixed to the engaging portion and the second body, and elastic force of the elastic fixing mechanism fixes the engaging member together with the engaging portion and the second body, such that the first body is assembled to the second body; when the first body is disassembled from the second body, the engaging member overcomes the elastic force and rotates from the second position to the first position, such that the first body is disassembled from the second body,
        wherein the engaging member is a polygon, and when the first body is assembled to the second body, the engaging member rotates from the first position to the second position, such that two of adjacent sides of the engaging member are infixed with one side of the engaging portion and the second body, respectively.

2. The electronic device as claimed in claim 1, wherein the elastic fixing mechanism is a spring, one end of the spring is fixed to the first body, the other end thereof is located next to the engaging member, when the first body is assembled to the second body, the engaging member rotates from the first position to the second position, and the spring presses against the engaging member so as to hold the engaging member together with the engaging portion and the second body.

3. The electronic device as claimed in claim 1, wherein the elastic fixing mechanism comprises:
    an elastic member; and
    a positioning member, the elastic member connected between the positioning member and the first body, wherein when the first body is assembled to the second body, the engaging member rotates from the first position to the second position, and the spring presses against the positioning member, such that the positioning member, the engaging portion and the second body together hold the engaging member so as to fix the engaging member.

4. The electronic device as claimed in claim 1, wherein the elastic fixing mechanism comprises:
    an elastic clip fixed to the engaging member; and
    a positioning member fixed to the first body, wherein when the first body is assembled to the second body, the engaging member rotates from the first position to the second position, and the elastic clip holds the positioning member so as to fix the engaging member.

5. The electronic device as claimed in claim 4, wherein the positioning member is a polygon, and the elastic clip holds sides of the polygon.

6. The electronic device as claimed in claim 1, wherein the elastic fixing mechanism comprises:
    a plurality of springs fixed to the engaging member; and
    a positioning member fixed to the first body, wherein when the first body is assembled to the second body, the engaging member rotates from the first position to the second position, and the springs together hold the positioning member so as to fix the engaging member.

7. The electronic device as claimed in claim 6, wherein the positioning member is a polygon, and the springs press a plurality of sides of the polygon, respectively, so as to hold the positioning member together.

8. The electronic device as claimed in claim 1, wherein a quantity of the connecting assembly is two, and the connecting assemblies are located at two opposite sides of the electronic device.

9. A connecting assembly, adapted for an electronic device, the electronic device comprising a first body and a second body, the connecting assembly disposed between two opposite assembling sides of the first body and the second body, such that the first body is detachably assembled to the second body, the connecting assembly comprising:
    an engaging member pivoted to the first body to rotate relative to the first body;
    an engaging portion fixed to the second body; and
    an elastic fixing mechanism connected to the first body, wherein when the first body is assembled to the second body, the engaging member rotates relative to the engaging portion from a first position to a second position, such that the engaging member is infixed to the engaging portion and the second body, and elastic force of the elastic fixing mechanism fixes the engaging member together with the engaging portion and the second body, such that the first body is assembled to the second body; when the first body is disassembled from the second body, the engaging member overcomes the elastic force and rotates from the second position to the first position, such that the first body is disassembled from the second body,
    wherein the engaging member is a polygon, and when the first body is assembled to the second body, the engaging member rotates from the first position to the second position, such that two of adjacent sides of the engaging member are infixed to one side of the engaging portion and the second body, respectively.

10. The connecting assembly as claimed in claim 9, wherein the elastic fixing mechanism is a spring, one end of the spring is fixed to the first body, the other end thereof is located next to the engaging member, when the first body is assembled to the second body, the engaging member rotates from the first position to the second position, and the spring presses against the engaging member so as to hold the engaging member together with the engaging portion and the second body.

11. The connecting assembly as claimed in claim 9, wherein the elastic fixing mechanism comprises:
   an elastic member; and
   a positioning member, the elastic member connected between the positioning member and the first body, wherein when the first body is assembled to the second body, the engaging member rotates from the first position to the second position, and the elastic member presses against the positioning member, such that the positioning member, the engaging portion and the second body together hold the engaging member so as to fix the engaging member.

12. The connecting assembly as claimed in claim 9, wherein the elastic fixing mechanism comprises:
   an elastic clip fixed to the engaging member; and
   a positioning member fixed to the first body, wherein when the first body is assembled to the second body, the engaging member rotates from the first position to the second position, and the elastic clip holds the positioning member so as to fix the engaging member.

13. The connecting assembly as claimed in claim 12, wherein the positioning member is a polygon, and the elastic clip holds sides of the polygon.

14. The connecting assembly as claimed in claim 9, wherein the elastic fixing mechanism comprises:
   a plurality of springs fixed to the engaging member; and
   a positioning member fixed to the first body, wherein when the first body is assembled to the second body, the engaging member rotates from the first position to the second position, and the springs together hold the positioning member so as to fix the engaging member.

15. The connecting assembly as claimed in claim 14, wherein the positioning member is a polygon, and the springs press a plurality of sides of the polygon, respectively, so as to hold the positioning member together.

\* \* \* \* \*